(12) United States Patent
Park et al.

(10) Patent No.: US 8,255,395 B2
(45) Date of Patent: Aug. 28, 2012

(54) MULTIMEDIA DATA RECORDING METHOD AND APPARATUS FOR AUTOMATICALLY GENERATING/UPDATING METADATA

(75) Inventors: Mi-hwa Park, Anyang-si (KR); Ju-hee Seo, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 607 days.

(21) Appl. No.: 12/037,997

(22) Filed: Feb. 27, 2008

(65) Prior Publication Data

US 2009/0070364 A1 Mar. 12, 2009

(30) Foreign Application Priority Data

Sep. 11, 2007 (KR) .................. 10-2007-0092046

(51) Int. Cl.
*G06F 17/30* (2006.01)
(52) U.S. Cl. ....................... 707/729; 707/730
(58) Field of Classification Search .......... 707/729, 707/730
See application file for complete search history.

(56) References Cited

U.S. PATENT DOCUMENTS

| | | | |
|---|---|---|---|
| 6,546,185 B1 | 4/2003 | Kim et al. | |
| 6,877,134 B1 | 4/2005 | Fuller et al. | |
| 6,980,652 B1* | 12/2005 | Braitberg et al. | 380/201 |
| 2004/0098398 A1* | 5/2004 | Ahn et al. | 707/100 |
| 2004/0205510 A1 | 10/2004 | Rising, III | |
| 2004/0263529 A1* | 12/2004 | Okada et al. | 345/619 |
| 2005/0111737 A1 | 5/2005 | Das et al. | |
| 2005/0207658 A1* | 9/2005 | Schofield | 382/232 |
| 2005/0262527 A1* | 11/2005 | Yuzawa et al. | 725/10 |
| 2006/0153535 A1 | 7/2006 | Chun et al. | |

FOREIGN PATENT DOCUMENTS

| | | |
|---|---|---|
| EP | 1213915 A2 | 6/2002 |
| IE | 20060826 A2 | 6/2007 |
| JP | 2003281163 A | 10/2003 |
| JP | 2004282114 A | 10/2004 |
| JP | 2006054002 A | 2/2006 |
| JP | 2006072835 A | 3/2006 |
| JP | 2006171891 A | 6/2006 |
| JP | 2007049332 A | 2/2007 |
| JP | 2007052575 A | 3/2007 |
| KR | 10-2000-0009742 A | 2/2000 |
| KR | 1020030062585 A | 7/2003 |

(Continued)

OTHER PUBLICATIONS

Wolf et al., "Smart Cameras as Embedded Systems", Compuer vol. 35, Issue 9, pp. 48-53, Sep. 2002 [retrieved on Feb. 5, 2012]. Retrieved from Internet :<URL: http://ieeexplore.ieee.org /xpls/abs_all.jsp?arnumber=1033027>.*

(Continued)

*Primary Examiner* — John E Breene
*Assistant Examiner* — Dennis Myint
(74) *Attorney, Agent, or Firm* — Sughrue Mion, PLLC

(57) ABSTRACT

Provided is a multimedia data recording method including: receiving one or more search object items for searching for scenes including the same kind of information from media data; selecting one or more scenes that contain each of the search object items during the input of the media data; generating metadata including one or more pieces of scene information from among an index or reproduction time of the selected scenes; and recording the metadata onto a header region and recording the media data onto a payload region.

24 Claims, 11 Drawing Sheets

FOREIGN PATENT DOCUMENTS

| KR | 1020040104481 A | 12/2004 |
| KR | 1020050099488 A | 10/2005 |
| KR | 10-2006-0081332 A | 7/2006 |
| KR | 10-0701163 B1 | 3/2007 |
| WO | WO 00/16243 * | 9/1999 |
| WO | 00/16243 A1 | 3/2000 |

OTHER PUBLICATIONS

Berriss W P, et al., "Real-Time Visual Analysis and Search Algorithms for Intelligent Video Surveillance", Jul. 9, 2003, pp. 1-4, XP002620332, Retrieved from the Internet: URL:http://www.uk.mitsubishielectric-rce.eu/pubdocs/VIL03-D013.pdf.

Supplementary European Search Report issued Feb. 23, 2011 in counterpart European Application No. 08723274.0.

Communication, dated Nov. 7, 2011, issued by the Korean Intellectual Property Office in corresponding Korean Application No. 10-2007-0092046.

Communication dated Feb. 14, 2012 issued by the Japanese Patent Office in counterpart Japanese Patent Application No. 2010-524769.

* cited by examiner

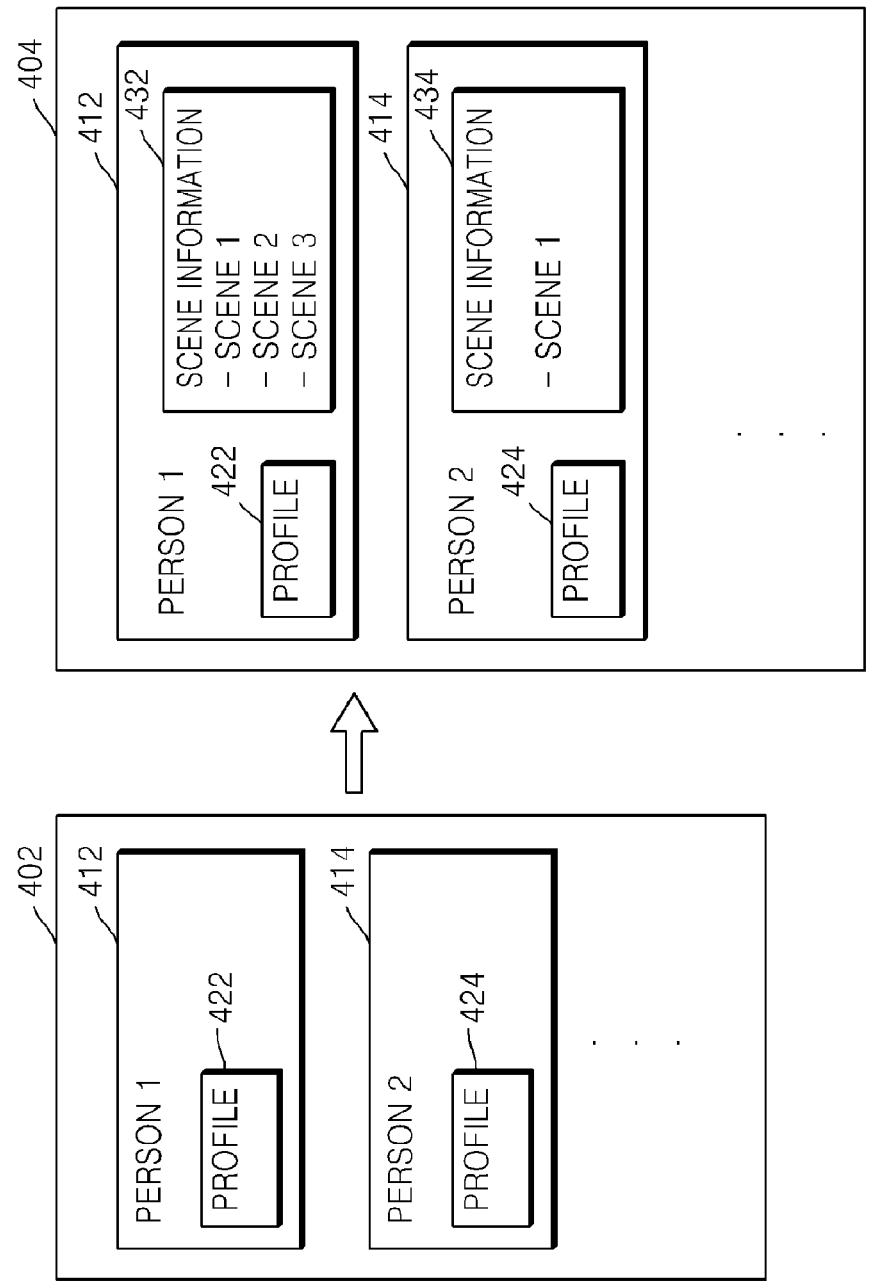

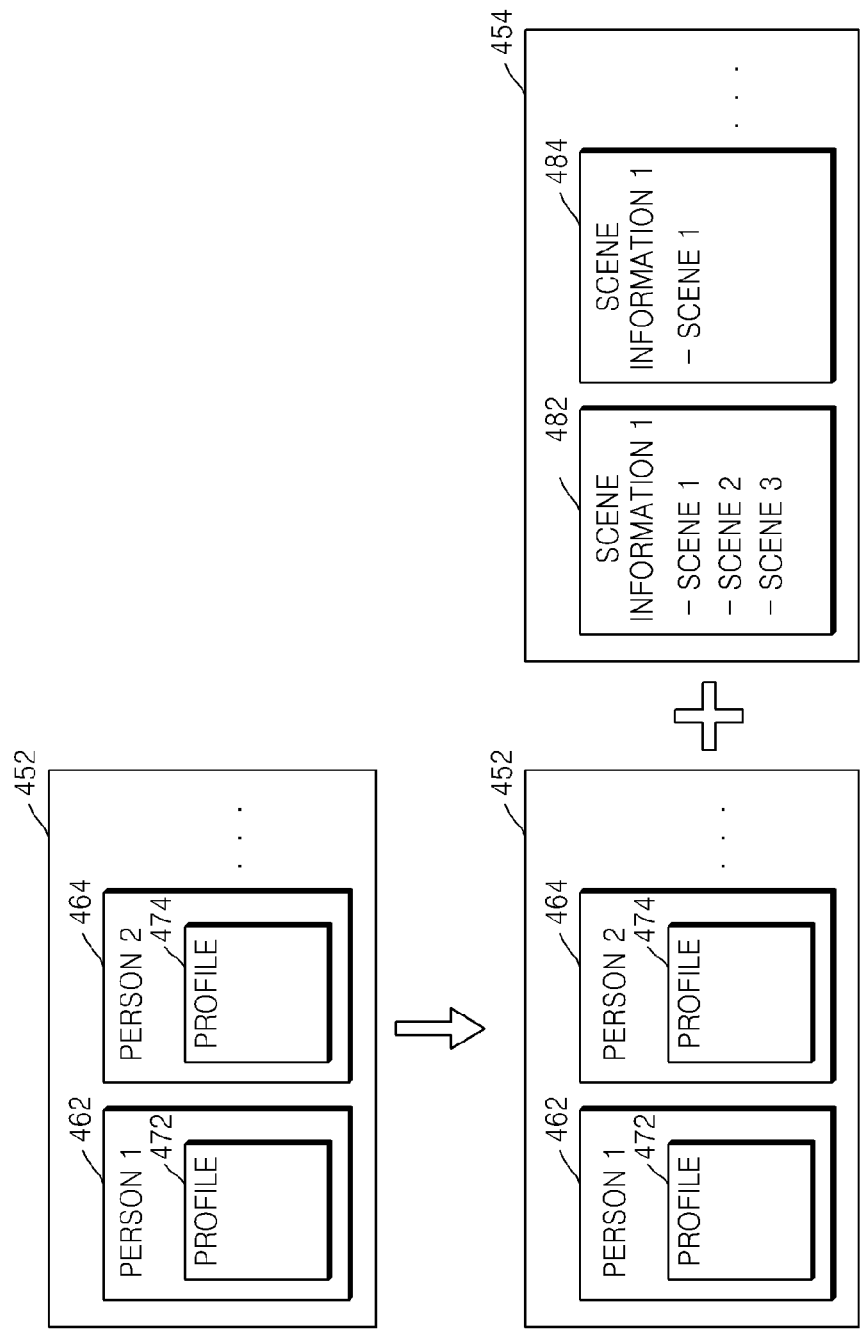

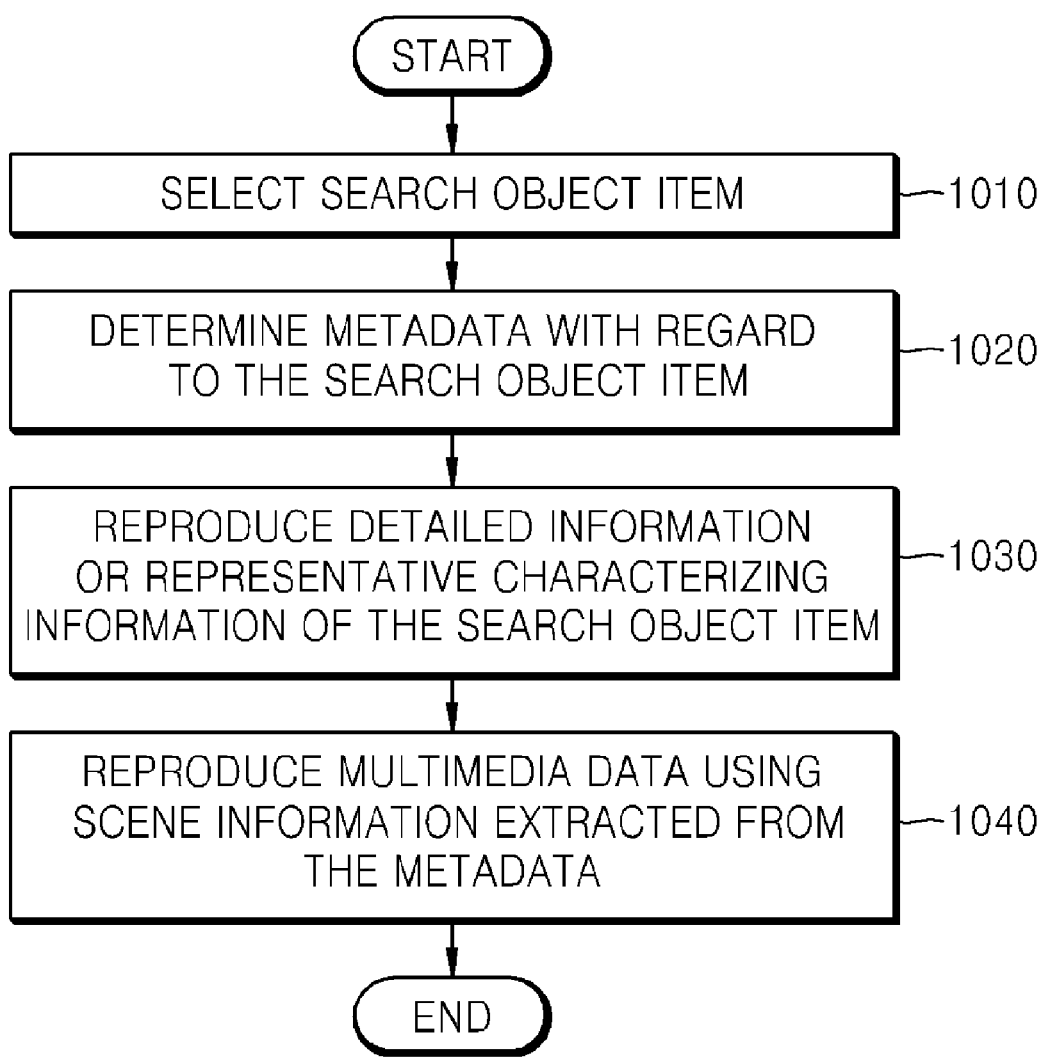

MULTIMEDIA DATA RECORDING METHOD AND APPARATUS FOR AUTOMATICALLY GENERATING/UPDATING METADATA

CROSS-REFERENCE TO RELATED PATENT APPLICATION

This application claims the benefit of Korean Patent Application No. 10-2007-0092046, filed on Sep. 11, 2007 in the Korean Intellectual Property Office, the disclosure of which is incorporated herein in its entirety by reference.

BACKGROUND OF THE INVENTION

1. Field of the Invention

Methods and apparatuses consistent with the present invention relate to recording multimedia data, and more particularly, to recording multimedia data capable of accomplishing various reproduction functions.

2. Description of the Related Art

General personal users as well as commercial content providers have recently started creating various types of multimedia content using digital image taking devices such as digital camcorders or digital cameras. In particular, user created content (UCC), which extends content information, is used commercially as well as in personal blogs.

As the number of UCC users expands and UCC production increases, multimedia image taking devices and multimedia data recording devices are expected to perform many more functions in order to produce UCC.

Packaged media such as digital versatile discs (DVDs) obtained from content providers include metadata in media files in order to reproduce packaged media using a variety of methods through multimedia reproduction devices. Conventional media files do not contain metadata on detailed search object items for allowing additional functions to be carried out but contain reproducible data only.

SUMMARY OF THE INVENTION

The present invention provides a method and apparatus for recording multimedia data capable of accomplishing various reproduction functions by newly generating or updating metadata.

The present invention also provides a method of automatically collecting information on scenes relating to search object items and recording the information in metadata through previously registered search object items for accomplishing various reproduction functions.

The present invention also provides a method of automatically collecting information on scenes relating to search object items and recording the information in metadata according to a user's decision.

According to an aspect of the present invention, there is provided a multimedia data recording method comprising: receiving one or more search object items for searching for scenes including the same kind of information from media data; selecting one or more scenes that contain each of the search object items during the input of the media data; generating metadata including one or more pieces of scene information from among an index or reproduction time of the selected scenes; and recording the metadata onto a header region and recording the media data onto a payload region.

The receiving of the one or more search object items may comprise: receiving the one or more search object items from at least one of a database and previously generated metadata.

The generating of the metadata may comprise: converting the metadata on which the one or more pieces of scene information is recorded into a multimedia data format.

The generating of the metadata may further comprise: generating the metadata including the one or more search object items; and updating the metadata including the one or more search object items to contain the one or more pieces of scene information.

The generating of the metadata may further comprise: generating the metadata including information on the selected scenes and information on a linkage between the one or more search object items.

The recording may comprise: recording the media data onto the payload region and simultaneously recording the metadata onto the header region.

The recording may further comprise: recording the metadata onto the header region after recording the media data onto the payload region.

The receiving of the one or more search object items may further comprise: receiving one or more pieces of representative characterizing information presenting each of the one or more search object items, and wherein the selecting of the one or more scenes comprises: analyzing a current scene of the input media data and extracting comparison information to be compared with the one or more pieces of representative characterizing information; measuring similarity between the extracted comparison information and the one or more pieces of representative characterizing information; and if the similarity is large, determining the current scene to be a scene containing the one or more search object items.

The selecting of the one or more scenes may further comprise: matching the input current scene to any one of the one or more search object items according to a user's request that is input via a user interface for matching the one or more search object items to the current scene.

The user interface comprises an image icon indicating each of the one or more search object items used to select the one or more search object items, and wherein the image icon is newly updated according to the current scene.

According to another aspect of the present invention, there is provided a multimedia data reproducing method comprising: selecting a search object item of a scene to be searched; determining metadata with regard to the search object item; and reproducing multimedia data using scene information extracted from the determined metadata.

The apparatus may further comprise: extracting and reproducing detailed information or representative characterizing information of the search object item from at least one of the metadata and database.

According to another aspect of the present invention, there is provided a multimedia data recording apparatus comprising: a search object item inputting unit receiving one or more search object items for searching for scenes including the same kind of information from media data; a scene selecting unit selecting one or more scenes containing one or more of the search object items during the input of the media data; a metadata generating unit generating metadata including one or more pieces of scene information from among an index or reproduction time of the selected scenes; and a recording unit recording the metadata onto a header region and recording the media data onto a payload region.

According to another aspect of the present invention, there is provided a computer readable recording medium storing a computer readable program for executing the multimedia data recording method.

According to another aspect of the present invention, there is provided a computer readable recording medium storing a computer readable program for executing the multimedia data reproducing method.

BRIEF DESCRIPTION OF THE DRAWINGS

The above and other aspects of the present invention will become more apparent by describing in detail exemplary embodiments thereof with reference to the attached drawings in which:

FIG. 4A illustrates metadata to be updated according to an exemplary embodiment of the present invention;

FIG. 4B illustrates metadata to be updated according to another exemplary embodiment of the present invention;

FIG. 11 is a flowchart of a multimedia data reproducing method according to an exemplary embodiment of the present invention.

DETAILED DESCRIPTION OF EXEMPLARY EMBODIMENTS OF THE INVENTION

The present invention will be described in detail by explaining exemplary embodiments of the invention with reference to the attached drawings.

Figure 1A:
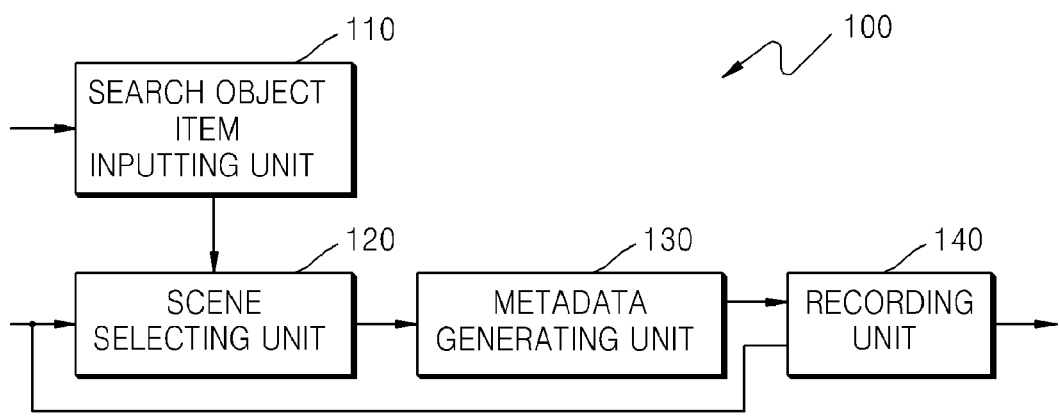
FIG. 1A is a block diagram of a multimedia data recording apparatus according to an exemplary embodiment of the present invention.

FIG. 1A is a block diagram of a multimedia data recording apparatus 100 according to an exemplary embodiment of the present invention. Referring to FIG. 1A, the multimedia data recording apparatus 100 comprises a search object item inputting unit 110, a scene selecting unit 120, a metadata generating unit 130, and a recording unit 140.

The search object item inputting unit 110 receives at least one search object item according to a user's input for classifying media data and outputs the search object item to the scene selecting unit 120.

The search object item inputting unit 110 may receive the search object item from at least one of a database or previously generated metadata. The search object item inputting unit 110 may further receive at least one piece of representative characterizing information that represents each search object item according to the user's input.

The search object item inputting unit 110 will be described with reference to FIG. 2.

The scene selecting unit 120 receives media data and the search object item from the search object item inputting unit 110, selects at least one scene of the media data which contains an object item corresponding to the search object item while receiving the media data, and outputs the selected scene to the metadata generating unit 130.

The media data of the present exemplary embodiment may be photographed or recorded in order to be input into the scene selecting unit 120.

Figure 1B:
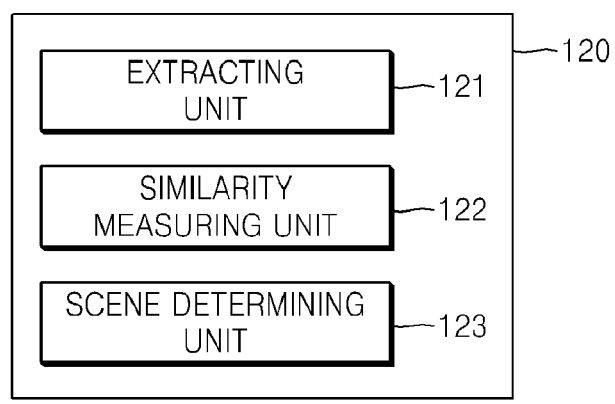
FIG. 1B is a block diagram of the scene selecting unit of the multimedia data recording apparatus according to an exemplary embodiment of the present invention.

As shown in FIG. 1B, the scene selecting unit 120 comprises a comparison information extracting unit 121 that analyzes a current scene of the received media data and extracts comparison information that is to be compared to the representative characterizing information, a similarity measuring unit 122 that measures the similarity between the comparison information and the representative characterizing information, and a scene determining unit 123 that, if the similarity is large, determines the current scene to be a scene containing an object item corresponding to the search object item.

The metadata generating unit 130 generates metadata including at least one piece of scene information from an index or a reproduction time of the selected scene received from the scene selecting unit 120, and outputs the metadata to the recording unit 140.

Although not shown, the metadata generating unit 130 further comprises a format converting unit that converts metadata in which the scene information is recorded into a multimedia data format.

The metadata generating unit 130 generates metadata including the search object item and updates the metadata to include the scene information.

Alternatively, the metadata generating unit 130 generates metadata including the scene information on the selected information and linkage information to the search object item.

The scene selecting unit 120 and the metadata generating unit 130 will be described in detail with reference to FIG. 3.

The recording unit 140 receives the metadata and the media data from the metadata generating unit 130, records the metadata in a header region, and records the media data in a payload region to generate multimedia data.

The recording unit 140 may record the media data in the payload region and simultaneously record the metadata in the header region.

Alternatively, the recording unit 140 may record the media data in the payload region and then record the metadata in the header region.

The recording unit 140 will be described in detail with reference to FIGS. 3, 4A, 4B, and 6.

Although not shown, the multimedia data recording apparatus 100 may further comprise a user interface for identifying a current scene which contains an object item corresponding to the search object item via a user's input. If the multimedia data recording apparatus 100 comprises the user interface, the scene selecting unit 120 uses the user interface to allow a scene of the media data to be selected if it contains any one of the search object items.

Alternatively, the multimedia data recording apparatus 100 may comprise a reproducing unit that records content in real time or searches for the search object items in desired multimedia data and reproduces the search object item.

Figure 2:
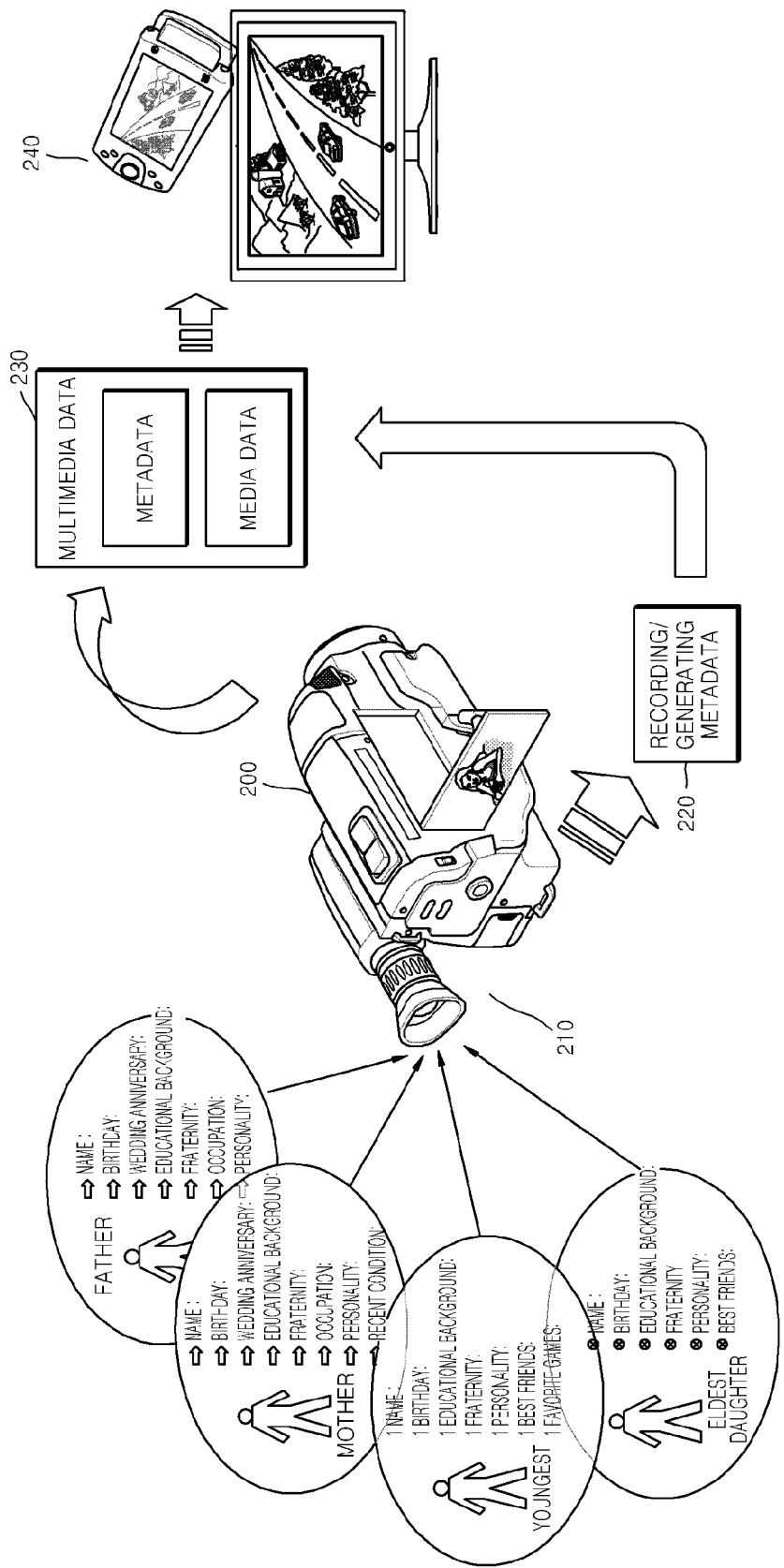
FIG. 2 illustrates an outline of the multimedia data recording apparatus illustrated in FIG. 1.

FIG. 2 illustrates an outline of the multimedia data recording apparatus 100 illustrated in FIG. 1A. Referring to FIG. 2, a digital camcorder 200 that is an exemplary embodiment of the multimedia data recording apparatus 100 is used to describe the function of the search object item inputting unit 110.

The digital camcorder 200 records media data including obtained video and sound information in multimedia data.

Before the search object item inputting unit 110 inputs the media data, a user previously stores search object items in a temporal database of the multimedia data recording apparatus 100. The user sets personal information 210, receives the personal information 210, and stores the personal information 210 in the database of the digital camcorder 200 in order to process the media data according to persons. The personal information 210 includes identifications such as "father", "mother", "youngest", and "eldest daughter", each including basic detailed information such as name, birthday, wedding anniversary, fraternity, occupation, and the like.

The basic detailed information can be updated and history information thereof can be stored in the search object item inputting unit 110. Further, the basic detailed information can be stored in the form of extensible markup language (XML).

The search object item inputting unit 110 further receives at least one piece of representative characterizing information that represents each search object item. For example, the representative characterizing information, such as a person's voice, photo, and the like, is registered in the personal information 210 and is used to measure similarity between people.

When the search object items to be used by the digital camcorder 200 are stored in the database that is previously stored in the digital camcorder 200 or are stored in current metadata, the search object items can be received from the database or the metadata.

The digital camcorder 200 records scene information generated using the personal information 210 in metadata 220, and records the obtained media data and the metadata 220 in the multimedia data 230.

A reproduction device 240 reproduces the multimedia data 230. The reproduction device 240 may be the multimedia data recording apparatus 200, and may reproduce the multimedia data generated by the multimedia data recording apparatus 200.

Figure 3:
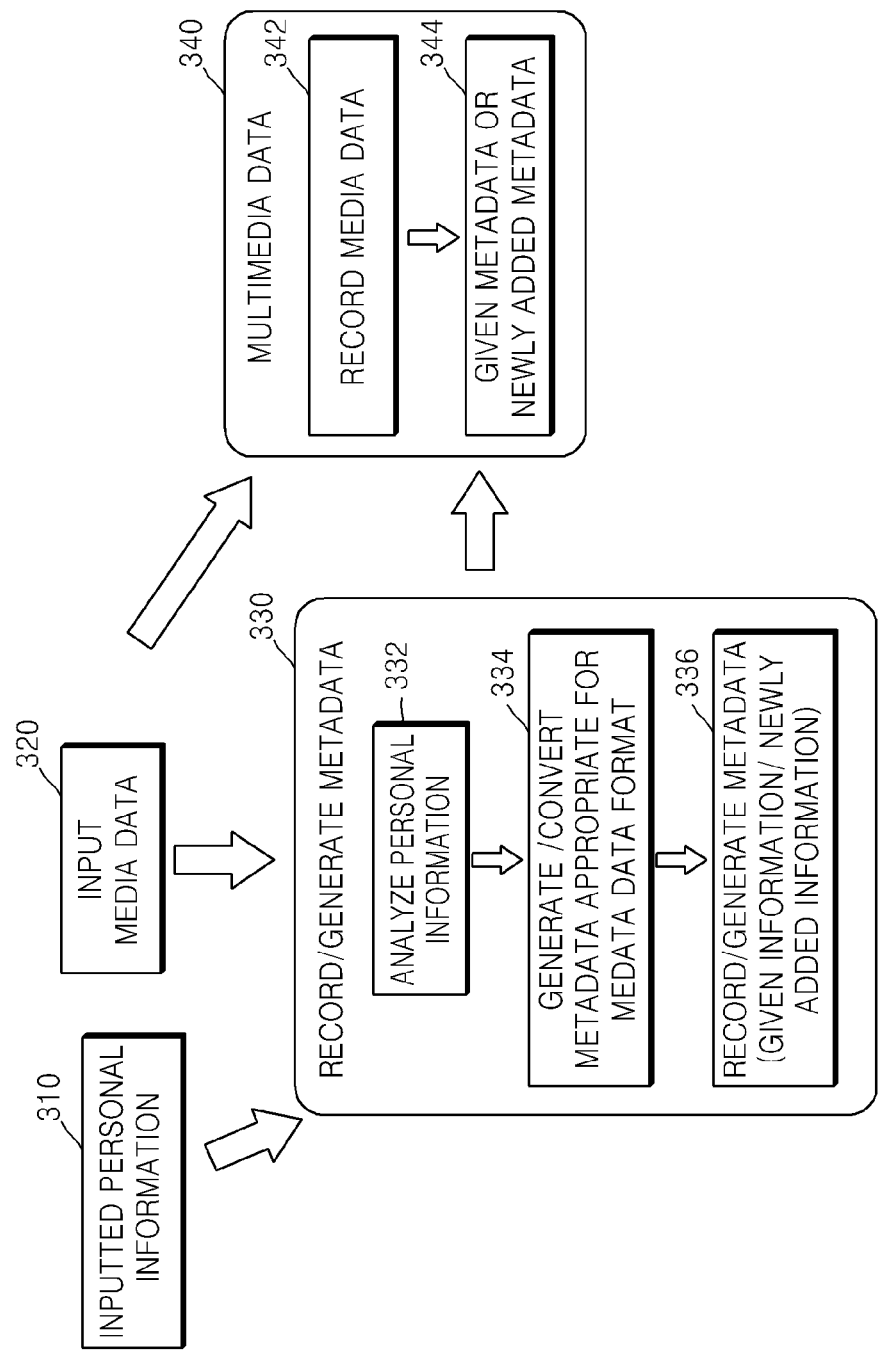
FIG. 3 is a diagram for explaining a method of generating or recording metadata or multimedia data of a multimedia data recording apparatus according to an exemplary embodiment of the present invention.

FIG. 3 is a diagram for explaining a method of generating or recording metadata or multimedia data of the multimedia data recording apparatus 100 according to an exemplary embodiment of the present invention. Referring to FIG. 3, functions of the scene selecting unit 120, the metadata generating unit 130, and the recording unit 140 are described. The functions of the comparison information extracting unit 121, the similarity measuring unit 122, and the scene determining unit 123 of the scene selecting unit 120 are described.

The search object item inputting unit 110 has previously received personal information input by a user. The multimedia data recording apparatus 100 may store the personal information in a temporal storage unit or database.

If media data is input into the multimedia data recording apparatus 100 (operation 310), the metadata generating unit 130 receives the personal information from the temporal storage unit or the database, extracts scene information corresponding to the personal information from the media data, and generates metadata including scene information on search object items (operation 330).

With regard to operation 330, it is determined whether a person that is a search object is included in a scene (operation 332), a metadata format is converted (operation 334), and metadata is generated or updated (operation 336).

With reference to operation 332, the scene information extracting unit 121 of the scene selecting unit 120 analyzes a current scene of the input media data and extracts information related to the search object item. The similarity measuring unit 122 of the scene selecting unit 120 measures similarity between the extracted information and representative characterizing information of the search object items of the metadata. If the similarity is large, the scene determining unit 123 of the scene selecting unit determines the current scene as a scene containing an object item corresponding to the search object item.

If the scene selecting unit 120 comprises a person's photo as the registered representative characterizing information of the search object item and compressed video as the input media data, the scene selecting unit 120 measures similarity between a person in frame of the media data and the registered photo using a face recognition method to analyze and compare the person in the input media data and in the photo.

Alternatively, the scene selecting unit 120 designates a specific sequence of the input media data, analyzes only persons of video of the sequence, and measures similarity between the persons.

If the input media data is sound, similarity between a person's sound that is the registered characterizing information and the sound of the input media data is measured.

If a word that is frequently used by a person is registered as the representative characterizing information of the personal information, it is determined whether the word is included in the sound of the input media data by analyzing the sound.

In operation 334, the format converting unit of the metadata generating unit 130 converts metadata in which the scene information is recorded into a multimedia data format. The metadata generating unit 130 newly generates metadata used to record the scene information on a scene containing object items corresponding to the search object items in accordance with the multimedia data format. The metadata generating unit 130 records a point of time at which a scene appears in the metadata as the scene information.

In operation 336, the metadata generating unit 130 adds the scene information to the given metadata information and records the combined information. Alternatively, the metadata generating unit 130 generates new metadata on which the scene information is recorded, in addition to the given metadata information.

The recording unit 140 records the metadata in a header region, records the media data to a payload region, and generates multimedia data (operation 340). The media data is recorded in the payload region (operation 342). The metadata is recorded in the header region (operation 344).

The recording unit 140 simultaneously records the media data and the metadata. In more detail, the media data is recorded in the payload region while the metadata is simultaneously recorded in the header region. Alternatively, the recording unit 140 records the metadata after recording the media data. In more detail, after the media data is recorded on the payload region, the metadata is recorded on the header region.

Exemplary embodiments of multimedia data generated by the multimedia data recording apparatus 100 will be described with reference to FIGS. 4A and 4B.

FIG. 4A illustrates metadata to be updated according to an exemplary embodiment of the present invention. Referring to FIG. 4A, the metadata generating unit 130 records information on the scene selected by the scene selecting unit 120 in metadata.

Only the search object items (personal information 412 and 414) are recorded in metadata 402 that has not been previously updated. Alternatively, the search object items 412 and 414 and detailed information 422 and 424 on the search object items 412 and 414, respectively, may be recorded in the metadata 402.

The metadata generating unit 130 additionally records scene information 432 and 434 on the search object items 412 and 414, respectively, on a scene that is selected by the scene selecting unit 120 in the metadata 402 and generates metadata 404. Therefore, given metadata is updated in the present exemplary embodiment.

FIG. 4B illustrates metadata to be updated according to another exemplary embodiment of the present invention. Referring to FIG. 4B, in addition to metadata 452 on which given search object items (personal information) are recorded, the metadata generating unit 130 newly generates metadata 454 on which scene information 482 and 484 on search object items 462 and 464, respectively, is recorded.

Therefore, in addition to the metadata 452 including the search object items 462 and 464 and detailed information 472 and 474 on the search object items 462 and 464, respectively, the generating unit 130 may newly generate the metadata 454 including scene information 482 and 484 that are classified under the search object items 462 and 464, respectively. In this regard, the newly generated metadata 454 may include information linked with the search object items 462 and 464 included in the metadata 452.

Figure 5:
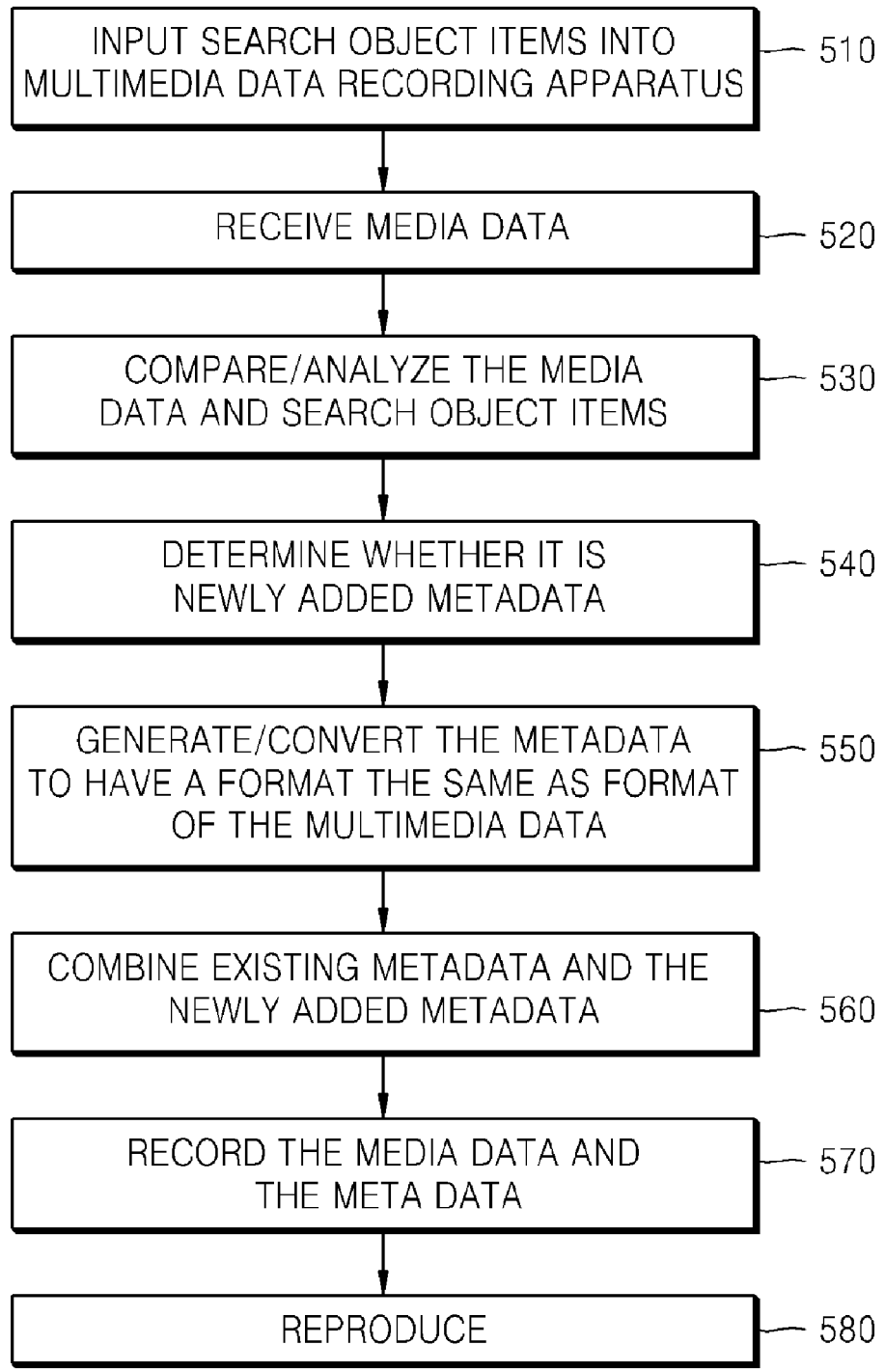
FIG. 5 is a flowchart of a method of generating multimedia data according to an exemplary embodiment of the present invention.

FIG. 5 is a flowchart of a method of generating multimedia data according to an exemplary embodiment of the present invention. Referring to FIG. 5, the search object item inputting unit 110 inputs search object items into the multimedia data recording apparatus 100 (operation 510). The multimedia data recording apparatus 100 receives media data (operation 520).

The comparison information extracting unit 121 of the scene analyzing unit 120 analyzes the input media data, extracts comparison information to be compared with the search object items, and the similarity measuring unit 122 compares the search object items and the comparison information (operation 530).

The scene determining unit 123 of the scene analyzing unit 120 determines whether to newly add scene information on a current scene as metadata (operation 540).

The metadata generating unit 130 newly generates metadata into which the scene information is to be recorded (operation 550). Alternatively, the converting unit of the metadata generating unit 130 converts the metadata into which the scene information is to be recorded into a multimedia data format.

The metadata generating unit 130 combines the given metadata information and the newly added metadata information (operation 560). The metadata generating unit 130 adds the scene information on a scene containing the search object items to the metadata into which the given search object items are recorded. Alternatively, the metadata generating unit 130 may generate metadata into which only the scene information is recorded.

The recording unit 140 records the media data onto a payload region, records the metadata into a header region, and generates multimedia data (operation 570).

The reproducing unit reproduces detailed information on the registered search object items (operation 580). Alternatively, the reproducing unit searches for the scene information on a scene containing a search object item that is recorded in the metadata, and reproduces the scene containing the desired search object item.

Figure 6:
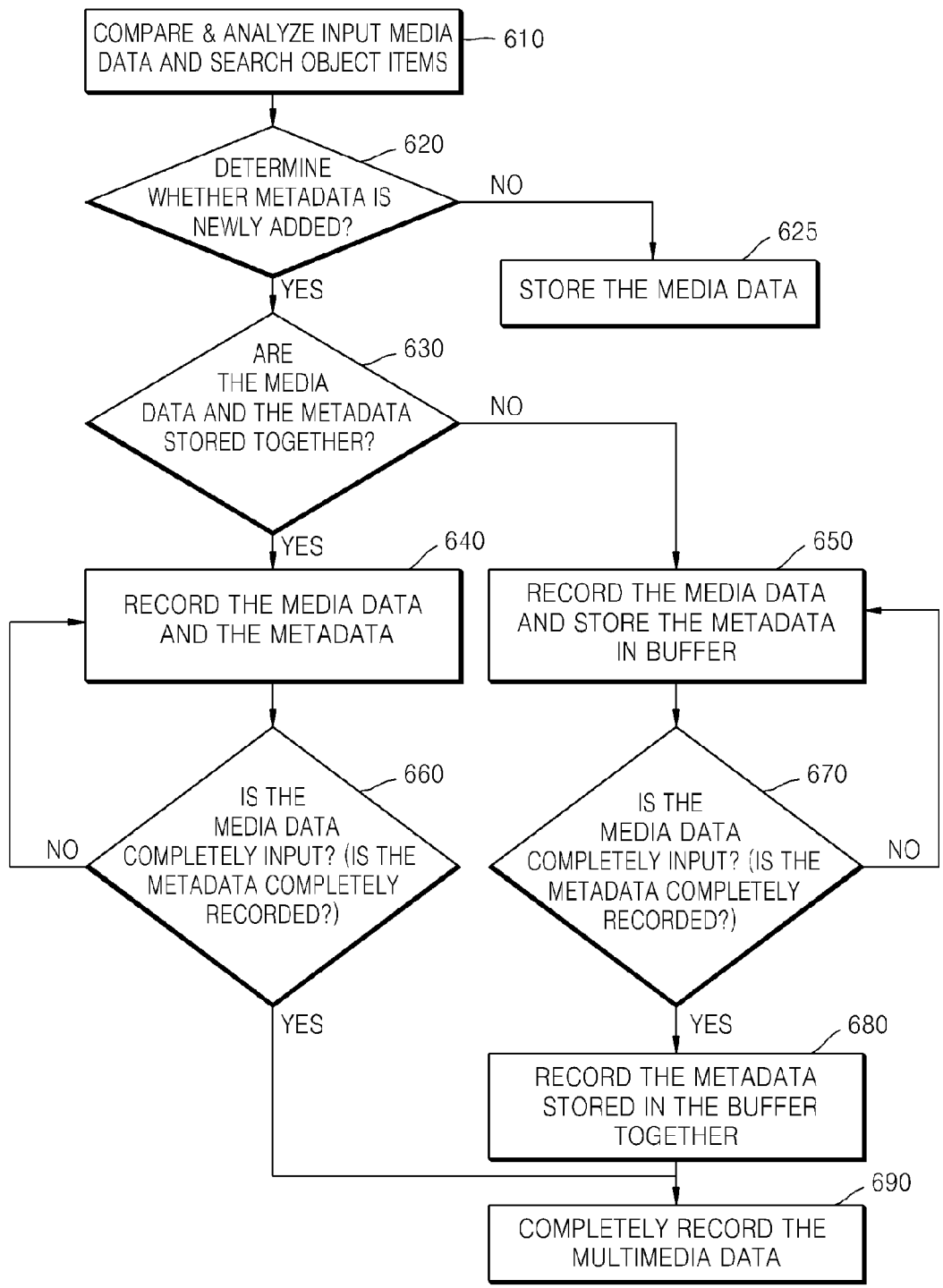
FIG. 6 is a flowchart of a method of generating multimedia data according to another exemplary embodiment of the present invention.

FIG. 6 is a flowchart of a method of generating multimedia data according to another exemplary embodiment of the present invention. The operation of the recording unit 140 will be described with reference to FIG. 6. Referring to FIG. 6, since media data is continuously recorded in multimedia data, it is determined whether metadata and the media data are recorded simultaneously.

Operation 610 is the same as operation 510 shown in FIG. 5.

Operation 620 is the same as operation 540 shown in FIG. 5. If information on a current scene is newly added to the metadata, operation 630 proceeds. If the information on the current scene is not newly added to the metadata, operation 625 proceeds.

In operation 625, since the information on the current scene is not newly added to the metadata, only the media data is stored.

In operation 630, it is determined whether to simultaneously record the metadata and the media data into the multimedia data. If it is determined that both metadata and media data are to be simultaneously recorded into the multimedia data, operation 640 proceeds. If it is determined that both metadata and media data are not to be simultaneously recorded into the multimedia data, operation 650 proceeds.

In operation 640, the metadata and the media data are simultaneously recorded into the multimedia data.

In operation 660 it is determined whether the media data has been completely input. That is, it is determined whether the media data has been completely recorded. If it is determined that the media data has been completely recorded, the multimedia data has been completely recorded (operation 690).

If it is determined that the media data is not completely recorded, operation 640 is repeated.

In operation 650 the media data is recorded into the multimedia data and the metadata is temporally stored in a buffer.

In operation 670 it is determined whether the media data is completely input, i.e. if the media data is completely recorded.

If it is determined that the media data is completely input, operation 680 proceeds. If it is determined that the media data is not completely input, operation 660 is repeated.

In operation 680, the metadata that is temporally stored in the buffer is recorded into the multimedia together. In operation 690, the multimedia data is completely recorded.

Figure 7:
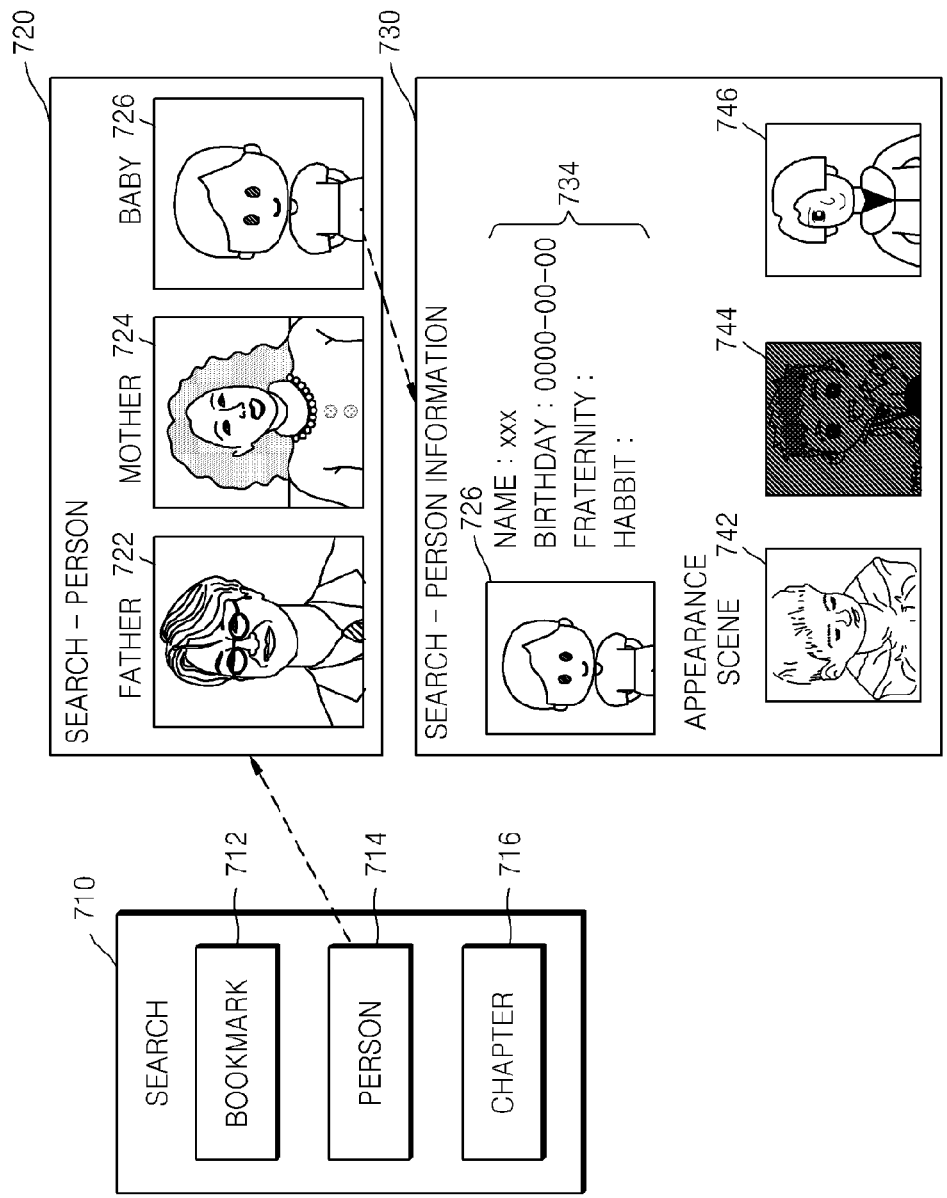
FIG. 7 is a diagram for explaining a method of searching for a persons information according to an exemplary embodiment of the present invention.

FIG. 7 is a diagram for explaining a method of searching for personal information according to an exemplary embodiment of the present invention. Referring to FIG. 7, the functions of the reproducing unit of searching for and reproducing search object items and basic detailed information are described. The search object items of the present exemplary embodiment are a bookmark, a person, and a chapter.

Icons 712, 714, and 716 denote the search object items that are search units.

Icons 722, 724, and 726 denote images of people registered in personal information.

Information 734 denotes the basic detailed information on a selected person. Images 742, 744, and 746 denote scenes in which the selected person appears.

When a user wishes to search for a scene containing a specific person, the reproducing unit selects the person icon 714 in a search menu 710 and identifies a person from the persons 722, 724, and 726 registered in a lower frame 720.

If the user selects the person 726, the reproducing unit reproduces an information menu 730 indicating the detailed information and the scene information on the selected person 726. The information menu 730 of the selected person 726 displays the basic detailed information 734 that is input into the multimedia data recording apparatus 100, and the images 742, 744, and 746 that display scenes at which the scenes are recorded into metadata. Therefore, if the user selects one of the appearance scenes, the reproducing unit searches for a scene at the time of the appearance, and reproduces the scene.

Figure 8:
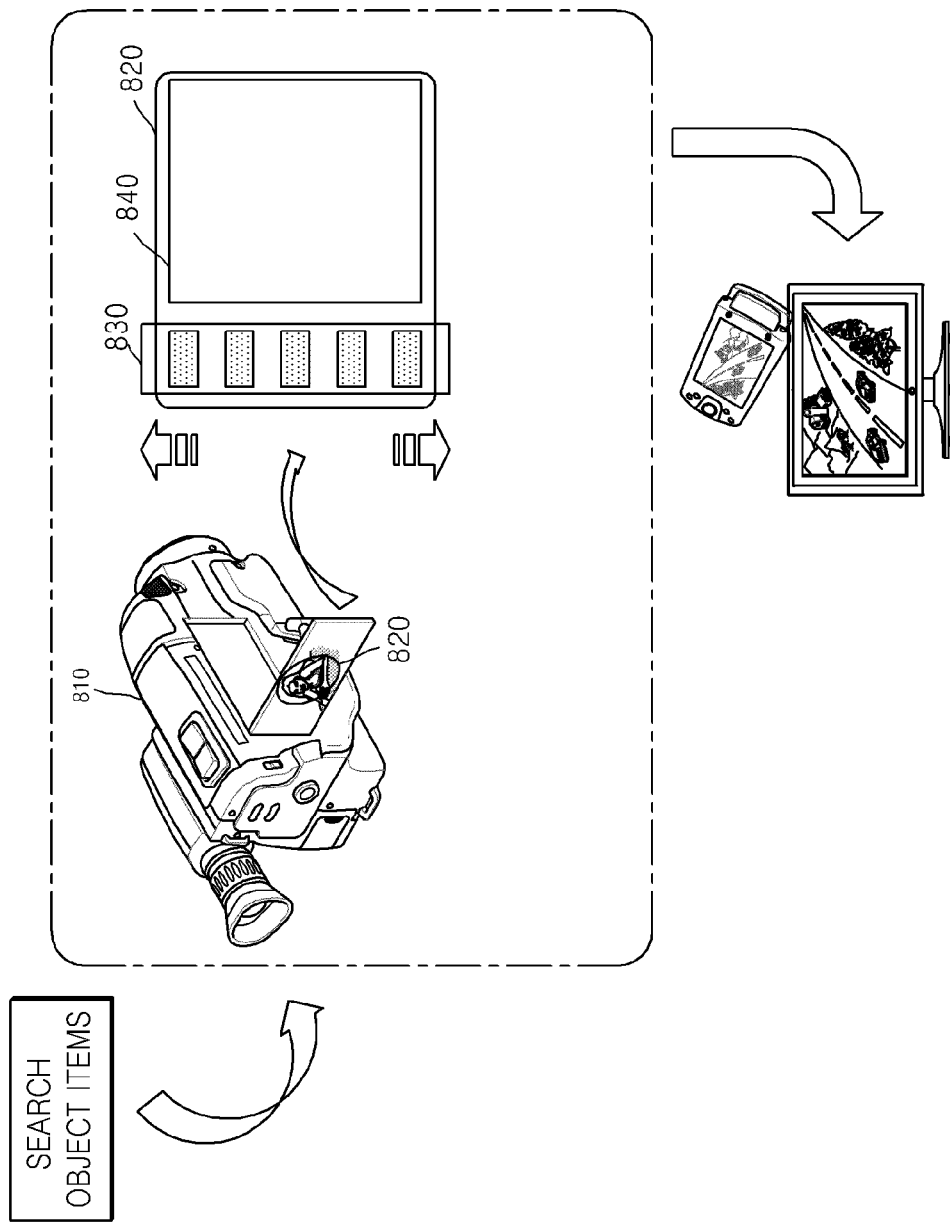
FIG. 8 is a diagram for describing a user interface of a multimedia data recording apparatus according to an exemplary embodiment of the present invention.

FIG. 8 is a diagram for explaining a user interface of the multimedia data recording apparatus 100 according to an exemplary embodiment of the present invention. Referring to FIG. 8, a digital camcorder 810 that is an example of the multimedia data recording apparatus 100 may include a reproduction screen 820 capable of reproducing multimedia data. The reproduction screen 820 comprises a search menu 830 in which icons of search object items are arranged and a reproduction window 840 in which current multimedia data is reproduced.

The multimedia data recording apparatus 100 comprises the user interface which is used to match the search object items with current scenes in which the search object items appear according to a user's request. The scene selecting unit 120 matches a currently input scene to one of the search object items using the user interface and selects a scene of the media data containing one of the search object items. The user interface may be in HTML format.

For descriptive convenience, the digital camcorder 810 can identify an image that is currently being filmed by the user through a frame 840, and comprises the user interface including a frame 830 in which search object items that are previously registered by the user are arranged.

When the user wishes to match a current scene to a specific search object item while viewing the image that is currently being filmed through the frame 840, the user selects an icon of the specific search object item within the frame 830, and scene information on the current scene may be determined as scene information containing the specific search object item.

The user interface comprises image icons indicating the search object items for selecting the search object items. The image icons may be updated to new image icons using a current image.

Figure 9:
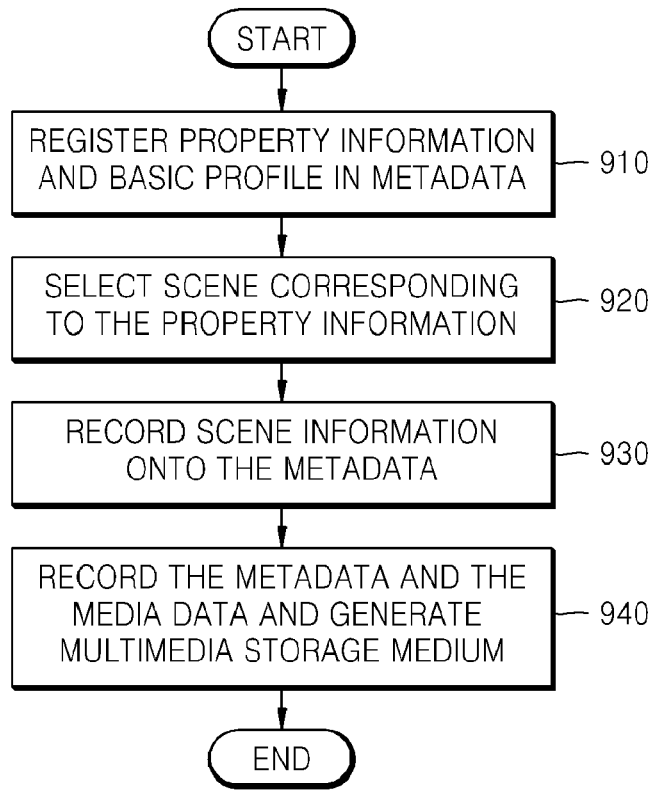
FIG. 9 is a flowchart of a multimedia data recording method according to an exemplary embodiment of the present invention.

FIG. 9 is a flowchart of a multimedia data recording method according to an exemplary embodiment of the present invention. Referring to FIG. 9, at least one classification reference item for classifying scenes of media data that contain search objects are input (operation 910).

At least one scene corresponding to each of the classification reference items is selected during the input of the media data (operation 920).

At least one piece of scene information among an index of the selected scene or a reproduction time is recorded into metadata (operation 930).

The metadata is recorded onto a header region, and media data is recorded onto a payload region and multimedia data is generated (operation 940).

Figure 10:
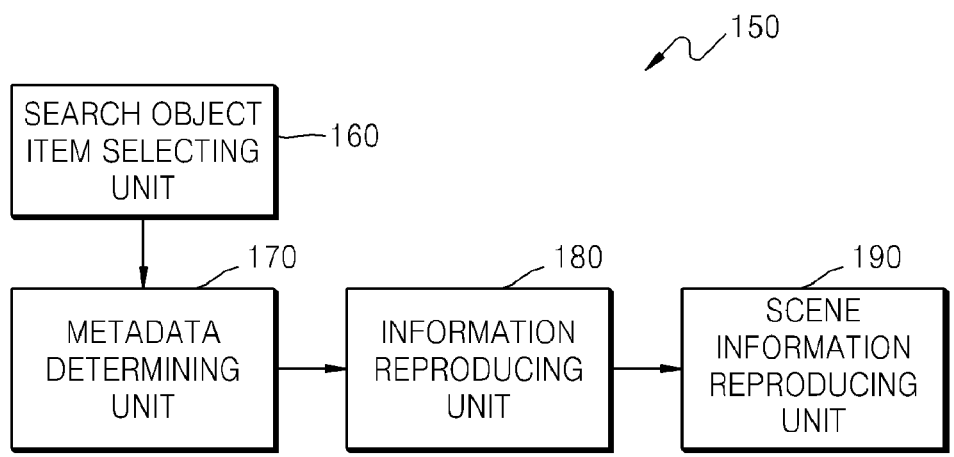
FIG. 10 is a block diagram of a multimedia data reproducing apparatus according to an exemplary embodiment of the present invention.

FIG. 10 is a block diagram of a multimedia data reproducing apparatus 150 according to an exemplary embodiment of the present invention. Referring to FIG. 10, the multimedia data recording apparatus 150 comprises a search object item selecting unit 160, a metadata determining unit 170, an information reproducing unit 180 and a scene reproducing unit 190.

FIG. 11 is a flowchart of a multimedia data reproducing method according to an exemplary embodiment of the present invention. Referring to FIG. 11, the search object item selecting unit 160 selects a search object item of a scene to be searched for (operation 1010).

The metadata determining unit 170 determines metadata of search object items (operation 1020).

The information reproducing unit 180 extracts detailed information or representative characterizing information on the search object items from at least one of the metadata or database and reproduces the extracted detailed information or representative characterizing information on the search object items(operation 1030).

The scene reproducing unit 190 uses the scene information that is extracted from the metadata to reproduce multimedia data (operation 1040).

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

Accordingly, the multimedia data recording method and apparatus of the exemplary embodiments of the present invention newly generate or update metadata to include scene information relating to a search object item, thereby reproducing a search object item desired by a user or reproducing a scene containing the search object item.

The recorded multimedia data according to the exemplary embodiments of the present invention makes it possible for a multimedia reproduction device to easily accomplish various functions such as content reproduction and content searches.

Metadata of multimedia content produced by a general user can be automatically newly generated or updated so that the user can easily create multimedia content.

The effects described above are not limited thereto, and other effects will be clearly understood by those of ordinary skill in the art as defined by the appended claims.

While this invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A multimedia data recording method comprising:
receiving one or more search object items for classifying and searching for scenes comprising a same kind of information from media data, wherein the same kind of information from the media data is characterizing information representing the one or more search object items;
selecting one or more scenes that comprise each of the search object items while the media data is being input to a multimedia data recording device with a storage;
generating metadata comprising one or more pieces of scene information from among an index or reproduction time of the selected scenes;
generating new metadata comprising information on the selected scenes and information on a linkage between the one or more search object items and the selected scenes; and
recording the metadata, the new metadata, and the media data.

2. The method of claim 1, wherein the receiving the one or more search object items comprises:
receiving the one or more search object items from at least one of a database and previously generated metadata.

3. The method of claim 1, wherein the generating the metadata comprises:
converting the metadata on which the one or more pieces of scene information is recorded into a multimedia data format.

4. The method of claim 1, wherein the generating the metadata further comprises:
generating the metadata comprising the one or more search object items; and
updating the metadata comprising the one or more search object items to contain the one or more pieces of scene information.

5. The method of claim 1, wherein the recording comprises:
recording the media data onto the payload region and simultaneously recording the metadata onto the header region.

6. The method of claim 1, wherein the recording further comprises:
recording the metadata onto the header region after recording the media data onto the payload region.

7. The method of claim 1, wherein the receiving the one or more search object items further comprises:
receiving one or more pieces of representative characterizing information presenting each of the one or more search object items, and
wherein the selecting of the one or more scenes comprises:
analyzing a current scene of the input media data and extracting comparison information to be compared with the one or more pieces of representative characterizing information;
measuring similarity between the extracted comparison information and the one or more pieces of representative characterizing information; and
if the similarity is greater than a certain amount, determining the current scene to be a scene containing the one or more search object items.

8. The method of claim 1, wherein the selecting the one or more scenes further comprises:
matching a current scene of the input media data to any one of the one or more search object items according to a request that is input via a user interface for matching the one or more search object items to the current scene.

9. The method of claim 8, wherein the user interface comprises an image icon indicating each of the one or more search object items used to select the one or more search object items, and
wherein the image icon is newly updated according to the current scene.

10. A multimedia data reproducing method comprising:
selecting a search object item among one or more search object items of a scene for classifying and searching for scenes including a same kind of information from media data, wherein the same kind of information from the media data is characterizing information representing the one or more search object items;
determining metadata extracted from the multimedia data, with regard to the selected search object item;
searching for, in the metadata, scene information on a scene comprising the selected search object item in media data extracted from the multimedia data, wherein the scene information is an index or reproduction time of the scene; and
reproducing the scene in the media data extracted from multimedia data using the searched scene information;
wherein the multimedia data is previously generated by selecting the scene comprising the selected search object item while the media data is being input to a multimedia data recording device with a storage, determining information on the selected scene and information on a linkage between the one or more search object items and the selected scene, and then recording, in the multitude data, the selected search object item and the selected scene as the metadata, the information on the selected scene and the information on a linkage as a new metadata, and the media data, respectively.

11. The apparatus of claim 10, further comprising:
extracting and reproducing detailed information or representative characterizing information of the search object item from at least one of the metadata and a database.

12. A multimedia data recording apparatus comprising:
a search object item inputting unit which receives one or more search object items for classifying and searching for scenes including a same kind of information from media data, wherein the same kind of information from the media data is characterizing information representing the one or more search object items;
a scene selecting unit which selects one or more scenes comprising one or more of the search object items while the media data is being input to a multimedia data recording device with a storage;
a metadata generating unit which generates metadata comprising one or more pieces of scene information from among an index or reproduction time of the selected scenes and further generates new metadata comprising information on the selected scenes and information on a linkage between the one or more search object items and the selected scenes; and
a recording unit which records the metadata, the new metadata, and the media data.

13. The apparatus of claim 12, wherein the search object item inputting unit receives the one or more search object items from at least one of a database and previously generated metadata.

14. The apparatus of claim 12, wherein the metadata generating unit comprises:
a format converting unit which converts the metadata in which the one or more pieces of scene information is recorded into a multimedia data format.

15. The apparatus of claim 12, wherein the metadata generating unit generates the metadata comprising the one or more search object items, and updates the metadata comprising the one or more search object items to contain the one or more pieces of scene information.

16. The apparatus of claim 12, wherein the recording unit records the media data onto the payload region and simultaneously records the metadata onto the header region.

17. The apparatus of claim 12, wherein the recording unit records the metadata onto the header region after recording the media data onto the payload region.

18. The apparatus of claim 12, wherein the search object item inputting unit further receives one or more pieces of representative characterizing information representing each of the one or more search object items, and
wherein the scene selecting unit comprises:
a comparison information extracting unit which analyzes a current scene of the input media data and extracting comparison information to be compared with the one or more pieces of representative characterizing information;
a similarity measuring unit which measures similarity between the extracted comparison information and the one or more pieces of representative characterizing information; and a scene determining unit which determines the current scene to be a scene comprising the one or more search object items if the similarity is large.

19. The apparatus of claim 12, wherein the scene selecting unit matches a current scene of the input media data to any one of the one or more search object items according to a request that is input via a user interface for matching the one or more search object items to the current scene.

20. The apparatus of claim 19, wherein the user interface comprises an image icon indicating each of the one or more search object items used to select the one or more search object items, and wherein the image icon is newly updated according to the current scene.

21. A multimedia data reproducing apparatus comprising:
a search object item selecting unit which selects a search object item among one or more search object items of a scene for classifying and searching for scenes including a same kind of information from media data, wherein the same kind of information from the media data is characterizing information representing the one or more search object items;
a metadata determining unit which determines metadata extracted from the multimedia data, with regard to the selected search object item; and
a scene reproducing unit which searches for, in the metadata, scene information on a scene comprising the selected search object item in media data extracted from the multimedia data, wherein the scene information is an index or reproduction time of the scene and reproduces the scene in the media data extracted from multimedia data using the searched scene information, wherein the multimedia data is previously generated by selecting the scene comprising the selected search object item while the media data is being input to a multimedia data recording device with a storage, determining information on the selected scene and information on a linkage between the one or more search object items and the selected scene, and then recording in the multimedia data, the selected search object item and the selected scene as the metadata the information on the selected scene and the information on a linkage as a new metadata, and the media data, respectively.

22. The apparatus of claim 21, further comprising: an information reproducing unit which extracts detailed information or representative characterizing information on the search object item from at least one of the metadata and a database and reproduces the extract detailed or representative characterizing information on the search object item.

23. A computer readable recording medium storing a computer readable program for executing the multimedia data recording method of claim 1.

24. A computer readable recording medium storing a computer readable program for executing the multimedia data reproducing method of claim 10.

* * * * *